United States Patent
Ganster et al.

(10) Patent No.: US 6,191,216 B1
(45) Date of Patent: *Feb. 20, 2001

(54) HYDROPHILIC, SELF-ADHESIVE POLYURETHANE GEL SUBSTANCES

(75) Inventors: Otto Ganster, Odenthal; Jörg Büchner, Gladbach; Jochen Werner Kenndoff, Neu Wulmstorf; Günther Sachau, Quickborn, all of (DE)

(73) Assignee: Bayer A.G., Leverkusen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/180,288
(22) PCT Filed: May 7, 1997
(86) PCT No.: PCT/EP97/02315
§ 371 Date: Nov. 3, 1998
§ 102(e) Date: Nov. 3, 1998
(87) PCT Pub. No.: WO97/43328
PCT Pub. Date: Nov. 20, 1997

(30) Foreign Application Priority Data

May 10, 1996 (DE) .............................. 196 18 825

(51) Int. Cl.⁷ ...................................... C08K 3/16
(52) U.S. Cl. .......................... 524/779; 523/111; 524/839; 524/871; 524/873; 524/875
(58) Field of Search ................. 523/111; 524/779, 524/839, 871, 873, 875

(56) References Cited

U.S. PATENT DOCUMENTS 4,404,296 * 9/1983 Schapel .
4,466,936 8/1984 Schapel .
4,584,362 * 4/1986 Leckart et al. ......................... 528/55
4,661,099 4/1987 von Bittera et al. .
5,428,659 * 6/1995 Renner et al. .
5,844,013 12/1998 Kenndoff et al. .

FOREIGN PATENT DOCUMENTS 4308347 9/1994 (DE) .
4308445 9/1994 (DE) .
57839 8/1982 (EP) .
147588 7/1985 (EP) .

OTHER PUBLICATIONS

Kunststoff Handuch, No. 7 Polyurethane, (Becker, Braun, Carl Hanser, Munich–Vienna, pp. 115–118) 1993.

Ullmann's Encyclopedia of Industrial Chemistry; Plastics, Additives; vol. A 20, pp. 461–479 (1992).

Ullmann's Encyclopedia of Industrial Chemistry; Rubber, 4. Chemicals and Additives; vol. A23, pp. 381–391 (1993).

Ullmann's Encyclopedia of Industrial Chemistry; Antioxidants; vol. A3, pp. 91–111 (1985).

Studies in Polymer Science 8; Absorbent Polymer Technology; pp. 9–22; 1990.*

Polyurethanes Chemistry and Technology; Part I. Chemistry; Saunders et al; pp. 32–45; 1962.*

* cited by examiner

Primary Examiner—John M. Cooney, Jr.
(74) Attorney, Agent, or Firm—Connolly, Bove, Lodge & Hutz LLP

(57) ABSTRACT

The invention relates to improved hydrophilic, polyurethane gel substances and foams, the use of polyurethane gel substances for pressure-distributing, in particular self-adhesive polyurethane-(foam) gels, and the use of said polyurethane gel substances for moulded structures and adhesive coatings.

7 Claims, No Drawings

HYDROPHILIC, SELF-ADHESIVE POLYURETHANE GEL SUBSTANCES

The present invention relates to improved hydrophilic, self-adhesive polyurethane gel compositions and foams prepared therefrom, to the use of the polyurethane gel compositions for pressure-distributing, in particular self-adhesive, polyurethane (foam) gels prepared therefrom and to the use of the polyurethane gel compositions for self-adhesive and pressure-distributing materials and adhesive layers.

Polyurethane gels and foams produced therefrom are known, for example, from EP 0 057 839, EP 0 147 588 or U.S. Pat. No. 4,661,099 and from applications DE 43 08 445 or DE 43 08 347. Some of the polyurethane gels described therein and the foams produced therefrom are self-adhesive systems which are capable of absorbing aqueous fluids in a range from a few percent of the weight thereof to more than 100 times the weight thereof, if fillers such as for example fluid-absorbing polymers are optionally incorporated therein.

The structural components in the gels and foam gels described in the stated documents, apart from polyhydroxy compounds, are aromatic or aliphatic polyisocyanates (but in fact in practice only aromatic polyisocyanates are used). However, if the gels are intended for use as adhesive layers for skin contact, then gels produced with aliphatic isocyanates are preferable to aromatically based gels. However, if an attempt is made to produce hydrophilic gels on the basis of aliphatic isocyanates using the formulations described in the above documents, due to the low reactivity of aliphatic NCO groups, only very slowly reacting mixtures are obtained if, in order to avoid skin incompatibility problems, it is possible to use only low concentrations of the amines or metal salts cited therein as catalysts. Another disadvantage of the aliphatic gels produced according to the above patent publications is that they are extremely sensitive to oxidative degradation, which very rapidly results in complete destruction of the gel (liquefaction) and renders these gels unusable for commercial applications.

In specific applications, for example in the medical sector, there is also a requirement for material sterility.

There are various ways in which sterile material may be obtained, such as for example radiation sterilisation, gas sterilisation with ethylene oxide or steam sterilisation.

The stated sterilisation processes are all used in the production of medical products or consumables, but they all have specific advantages and disadvantages.

One important method is $\gamma$ radiation sterilisation. This method has the advantage that the material to be sterilised may already be in a tightly sealed package and no residues from the sterilisation process remain in the material to be sterilised. The disadvantage is that in many materials, such as for example materials of organic origin or synthetic polymers, free radicals are formed which subsequently result in degradation of the material. This thus results in immediate decomposition or a distinct reduction in the storage life of the material after sterilisation.

In polyurethane gels or polyurethane foam gels, this is manifested by a loss of cohesion of the gel material. In extreme cases, $\gamma$ sterilisation transforms the gel or foam gel back into a highly viscous liquid.

An object of the invention was accordingly to provide aging-resistant polyurethane gels on the basis of aliphatic isocyanates while avoiding amine catalysts, which gels, despite the low reactivity of the aliphatic NCO groups, react as least as fast as conventional products produced with aromatic isocyanates and furthermore to provide polyurethane foam gels and $\gamma$-sterilisable polyurethane gels and polyurethane foam gels.

The present invention accordingly provides hydrophilic, self-adhesive polyurethane gels consisting of
a) polyether polyols with 2 to 6 hydroxyl groups and having OH values of 20 to 112 and an ethylene oxide (EO) content of $\geq 10$ wt. %,
b) anti-oxidants,
c) bismuth(III) carboxylates soluble in the polyols a) and based on carboxylic acids having 2 to 18 C atoms as catalysts together with
d) hexamethylene diisocyanate or a modified hexamethylene diisocyanate, wherein the product of the functionalities of the polyurethane-forming components a) and d) is at least 5.2, the quantity of catalyst c) amounts to 0.005 to 0.25 wt. %, relative to the polyols a), the quantity of anti-oxidants b) is in the range of $\geq 0.1$ wt. %, relative to the polyols a) and a ratio of free NCO groups in component d) to the free OH groups in component a) (isocyanate index) in the range from 0.30 to 0.70 is selected.

According to the invention, preferred polyether polyols are those with 3 to 4, particularly preferably 4, hydroxyl groups and having an OH value in the range from 20 to 112, preferably from 30 to 56. The ethylene oxide content in the polyether polyols used according to the invention is preferably $\geq 20$ wt. %.

The polyether polyols according to the invention are known per se and are produced, for example, by polymerising epoxides, such as ethylene oxide, propylene oxide, butylene oxide or tetrahydrofuran with themselves or by addition of these epoxides, preferably ethylene oxide and propylene oxide (optionally mixed together or separately in succession), onto starter components having at least two reactive hydrogen atoms, such as water, ethylene glycol, propylene glycol, diethylene glycol, dipropylene glycol, glycerol, trimethylolpropane, pentaerythritol, sorbitol or sucrose. Representatives of the stated relatively high molecular weight polyhydroxyl compounds to be used according to the invention are listed, for example, in High Polymers, volume XVI, Polyurethanes, Chemistry and Technology, (Saunders-Frisch, Interscience Publishers, New York, volume 1, 1962, pp. 32–42).

The isocyanate component used according to the invention is monomeric or trimerised hexamethylene diisocyanate or also hexamethylene diisocyanate modified by biuret, uretidione, allophanate groups or by prepolymerisation with polyether polyols or mixtures of polyether polyols based on known starter components having 2 or >2 reactive H atoms and epoxides, such as ethylene oxide or propylene oxide, and of an OH value of $\leq 850$, preferably of 100 to 600. It is preferred to use modified hexamethylene diisocyanate, in particular hexamethylene diisocyanate modified by prepolymerisation with polyether diols of an OH value of 200 to 600. Very particularly preferred modification products of hexamethylene diisocyanate are those with polyether diols of an OH value of 200–600 and having a residual content of monomeric hexamethylene diisocyanate of below 0.5 wt. %.

Catalysts which may be considered for the polyurethane gels according to the invention are bismuth(III) carboxylates soluble in the anhydrous polyether polyols a) and based on linear, branched, saturated or unsaturated carboxylic acids having 2 to 18, preferably 6 to 18 C atoms. Bismuth(III) salts of branched saturated carboxylic acids having tertiary carboxyl groups are preferred, such as those of 2,2-dimethyloctanoic acid (for example versatic acids, Shell). Preparations of these Bi(III) salts in excess quantities of these carboxylic acids are very suitable. A solution of 1 mole of the Bi(III) salt of versatic 10 acid (2,2-dimethyloctanoic acid) in an excess of 3 moles of this acid and having a Bi content of 17% has proved outstandingly suitable.

According to the invention, the catalysts are preferably used in quantities of 0.01 to 0.3, in particular of 0.03 to 0.15 wt. %, relative to the polyol a).

Anti-oxidants (stabilisers) which may be considered for the polyurethane gels and polyurethane foam gels according to the invention are in particular sterically hindered phenolic stabilisers, such as BHT (2,6-di-tert.-butyl-4-methylphenol), Vulkanox BKF (2,2'-methylene-bis-(6-tert.-butyl-4-methylphenol)) (Bayer AG), Irganox 1010 (pentaerythrityltetrakis[3-(3,5-di-tert.-butyl-4-hydroxyphenyl) propionate]), Irganox 1076 (octadecyl-3-(3,5-di-tert.-butyl-4-hydroxyphenyl) propionate), Irganox 1330 (1,3,5-trimethyl-2,4,6-tris(3',5'-di-tert.-butyl-4'-hydroxybenzyl)benzene), Irganox 1520 (2-methyl-4,6-bis[(octylthio)methyl]phenol) (Ciba-Geigy) and/or tocopherols. a-Tocopherol (vitamin E) type anti-oxidants are preferably used. Further stabilisers are stated, for example, in Ullmann (volume A3, pp. 91–111; volume A20, pp. 461–479; volume A23, 381–391).

The stabilising characteristics of the phenolic stabilisers may be still further improved by the addition of organically substituted sulfides or disulfides, such as for example Irganox PS800 (3,3'-thiodipropionic acid dilauryl ester) or dioctyldidecyl disulfide. Combinations of the phenolic types together are also possible.

Addition of the listed stabilisers in particular allows the production of products which may also be sterilised by high energy γ radiation from the polyurethane gels and polyurethane foam gels according to the invention. This is exceptionally significant in particular in the production of medical articles, such as for example wound care products (inter alia rapid wound dressings, sticking plasters or pads).

The anti-oxidants are preferably used in quantities of 0.15 to 5 wt. %, in particular of 0.2 to 2.0 wt. %, relative to the polyol a). In the case of anti-oxidant mixtures, as are mentioned above, the anti-oxidants are preferably used in quantities of 0.05 to 0.5 wt. % per individual substance, relative to the polyol a).

According to the invention, additives conventional for polyurethanes, such as fillers, dyes, thickeners, extenders, resins etc., may be added to the hydrophilic gel compositions, preferably in an amount of up to 100 wt. %, relative to the polyols a). The fillers used are the additives known per se from polyurethane chemistry, such as for example inorganically or organically based short fibres. Inorganic fillers which may in particular be mentioned are powders prepared from zinc oxide and titanium oxide, together with glass fibres, such as glass fibres of 0.1–1 mm in length. Organic fillers which may in particular be listed are swellable powders and fibres having a fibre length of >0.01 mm, for example fibres based on polyacrylic acids and the salts thereof or others, as are for example stated in Absorbent Polymer Technology (Brannon-Peppas, Harland, Elsevier, Amsterdam-Oxford-New York-Tokyo, 1990, pp. 9–22), and materials used as textile fibres, such as for example polyester or polyamide fibres. Dyes or colouring pigments should in particular be taken to be those as may be used in foodstuffs, packaging or cosmetics. Liquid extenders or resins are in particular polymeric vinyl compounds, polyacrylates and other copolymers conventional in adhesives technology, which may have an influence upon adhesion properties.

The hydrophilic gel compositions may also be foamed according to the invention, wherein the density of the foamed gel is reduced as far as down to ⅙ of the initial density of the gel composition. Foaming agents which may be used are the foaming agents usual in polyurethane chemistry. These include, for example, carbon dioxide produced chemically in situ as the reaction product of isocyanate and water or physically acting, anhydrous blowing agents such as low boiling liquids, for example HFC 113, HCFC 22 or n- and iso-pentane, cyclopentane, butanes and hexanes. Further agents are described, for example, in Kunststoff Handbuch, no. 7, Polyurethane (Becker, Braun, Carl Hanser, Munich-Vienna, 1993, pp. 115–118). Inert gases are, however, in particular suitable for foaming the polyurethane compositions according to the invention. This is achieved by beating in gases, such as nitrogen, noble gases or carbon dioxide, without addition of water, using conventional commercial polyurethane mixing methods.

The isocyanate index (the ratio of free NCO groups used in the reaction to free OH groups) of the polyurethane gels and polyurethane foam gels according to the invention is in the range from 0.3 to 0.7, preferably in the range from 0.42 to 0.60, depending upon the functionality of isocyanate and polyol components used. The isocyanate index, which characterises the quality of the polyurethane (foam) gel, may very simply be estimated using the following formula:

$$\text{Index} \approx \frac{f(\text{isocyanate})}{f(\text{polyol}) \times (f(\text{isocyanate}) - 1)}$$

wherein f denotes the finctionality of the isocyanate or polyol component.

Depending upon the desired tack or elasticity of the gel, the isocyanate index actually used may deviate by up to ±20% from the calculated value.

The polyurethane gel compositions according to the invention are produced using conventional processes, as are for example described in Becker/Braun, Kunststoff-Handbuch, volume 7, Polyurethane, pp. 139 et seq., Carl-Hanser Verlag Munich-Vienna, 1993.

The polyurethane gel compositions and polyurethane foam gel compositions according to the invention may generally be used for the production of mouldings and adhesive layers, in particular of products which come into contact with human and animal tissues, such as with the skin, with mucous membranes or with open wounds or body fluids or secretions, such as for example saliva, blood, wound fluids, urine, faeces or sweat. The materials are also suitable for sticking or attachment to the skin. Use in medical applications is preferred, in particular as weakly or strongly self-adhesive coatings, used as sticking plasters, rapid wound dressings or for sticking wound care products onto the body's surface. They also act to absorb blood and wound secretions and to provide padding and thermal insulation. Absorption of liquids may be accelerated by foaming the gels according to the invention. A distinctly improved padding effect and improved thermal insulation are furthermore achieved. Further areas of application are orthopaedic articles, personal hygiene or cosmetic articles or highly moisture absorbing, swellable and cushioning overlays or inserts, optionally also as pressure-distributing filling compositions for cushions or padding elements.

EXAMPLES

1. Components Used

1.1 Isocyanate 1 (according to the invention)

7 moles of hexamethylene diisocyanate and 1 mole of a polypropylene oxide diol having an average molecular weight of 400 (OH value=280) were reacted at 80° C. The excess monomeric diisocyanate was then removed by distillation in an evaporator at approximately 0.5 mbar down to a residual content of approx. 0.2 wt. %. The remaining NCO prepolymer had an NCO content of 12.6 wt. % and a viscosity (at 23° C.) of 2500 mPa×s.

1.2 Isocyanate 2 (comparison)

NCO prepolymer produced from 5.1 moles of 4,4'-MDI and 1 mole of a polypropylene glycol having an average molecular weight of 220. The starting materials were reacted at 80° C. An NCO prepolymer having an NCO content of 22.7% is obtained.

1.3 Base Polyol

Polyether polyol of the following structure:

Pentaerythritol + propylene oxide + ethylene oxide copolymer end-blocked with ethylene oxide.

Functionality: 4; OH value: 35; average molecular weight: 6400 (calculated), ethylene oxide content: 20 wt. %.

0.50 wt. % of BHT was added to the base polyol before processing to produce the gel.

1.4 Bi(III) Salt Catalyst

Solution of 1 mole of the Bi(III) salt with 2,2-dimethyloctanoic acid in 3 moles of 2,2-dimethyloctanoic acid (having a bismuth content of approximately 17 wt. %); (commercially available under the name Coscat 83; manufacturer: Cosan Chemical Corp., Carlstadt, N.J., USA).

2. Measurements of Reaction Rate

The gelation time of the mixture at room temperature (23° C.) was determined as a measure of reactivity: 1000 g of the base polyol were combined with the catalyst and homogenised for 2 hours at room temperature in a 1 litre stirring apparatus. 100 g of this mixture were combined with 10.4 or 5.7 g of isocyanates 1 or 2 and vigorously mixed with a glass rod for 1 minute. Gelation was tested at one minute intervals: gelation was achieved once the reaction mixture was no longer pourable and adhering gel was torn off when the glass rod was pulled out quickly.

The same base polyol was used in all of the Examples. The gelation time of Comparative Example 1 indicates the gelation speed which has proved successful in practical processing with an aromatic diisocyanate (isocyanate 2). Examples 1 and 2 are according to the invention. Example 1 demonstrates that, when aliphatic isocyanate 1 is used, the bismuth(III) salt catalyst is capable of accelerating crosslinking up to the level of conversion achieved with the aromatic isocyanate 1 in Comparative Example 1. Example 2 demonstrates in comparison with Comparative Example 2 that, when the aliphatic diisocyanate is used, the bismuth (III) salt catalyst is very much more effective than the tin catalyst which is conventionally considered highly effective (in Comparative Example 2).

|  | Comparative Example 1 | Example 1 | Example 2 | Comparative Example 2 | Unit |
|---|---|---|---|---|---|
| Base polyol | 100 | 100 | 100 | 100 | pbw |
| DBTL* | 0.02 | — | — | 0.15 | pbw |
| Bi(III) salt catalyst** | — | 0.03 | 0.15 | — | pbw |
| Isocyanate 2 | 5.7 | — | — | — | pbw |
| Isocyanate 1 | — | 10.4 | 10.4 | 10.4 | pbw |
| Isocyanate index | 0.50 | 0.50 | 0.50 | 0.50 |  |
| Gelation time | 12 | 11 | 3 | 29 | minutes |

*dibutyltin dilaurate
pbw = parts by weight
**Coscat 83

3. Measurements of Stability

The storage specimens were produced by combining the polyol stated in 1.3 prior to processing, not with 0.5 wt. % of BHT, but instead with the anti-oxidant or combinations to be tested.

3.1 Production of the Specimens

1) A parts by weight (pbw) of the base polyol were combined optionally with B pbw of anti-oxidant, C pbw of catalyst and also with E pbw of filler and homogenised for 2 hours at room temperature in a 1 litre stirring apparatus (c.f. table 1). Y pbw of this mixture were combined with Z pbw of isocyanate 1 or 2 and vigorously mixed with a glass rod for 1 minute (c.f. table 2).
   While still liquid, the material was cast on siliconised paper into sheets of a thickness of 1–2 mm and cured for 10 minutes at 80° C. in a drying cabinet.
2) A parts by weight (pbw) of the base polyol were combined with B pbw of anti-oxidant, C pbw of catalyst and optionally also E pbw of filler and homogenised for 2 hours at room temperature in a 5 litre stirring apparatus. Using a standard mixing and metering unit for processing polyurethane and adhesive preparations, Y pbw of this mixture were vigorously mixed with Z pbw of isocyanate 1 and optionally F pbw of the foaming agent.
   a) Approx. 10 g of the finished reaction mixture were cast on PE lids into sheets of a thickness of 1–2 mm and then cured for 10 minutes at 80° C. in a drying cabinet.
   b) Alternatively, using a coating knife, the liquid composition was spread out into flat structures of a thickness of 1–2 mm. The material was then cured for 18 minutes at 80° C.
   c) Alternatively, using a coating knife, the liquid composition was spread out into flat structures of a thickness of 1–2 mm. The material was then cured for 6 minutes at 70° C.

The specimens were stored uncovered in crystallising dishes of a diameter of 23 cm in a circulating air drying cabinet at 70° C. Initially at intervals of 1 week, subsequently of 4 weeks, the specimens were visually inspected and tested for resistance by stirring with a glass rod (c.f. table 3).

The specimens were deemed to have been destroyed once they had melted, become crumbly or very soft.

TABLE 1

Details of mixture composition

| | | Mixture | | | | |
|---|---|---|---|---|---|---|
| Specimen | Method | Base polyol A [pbw] | Filler E [pbw] | Catalyst C [pbw] | Stabiliser B | Stabiliser B [pbw] |
| 1 | 1) | 100 | 42.9 | 0.1 Bi(III) salt | BHT + Vit. E | 0.1 + 0.5 |
| 2 | 1) | 100 | 42.9 | 0.1 Bi(III) salt | none | |
| 3 | 1) | 100 | 42.9 | 0.1 Bi(III) salt | none | |
| 4 | 1) | 100 | 42.9 | 0.1 Bi(III) salt | none | |
| 5 | 1) | 100 | 42.9 | 0.1 Bi(III) salt | none | |
| 6 | 1) | 100 | 42.9 | 0.1 Bi(III) salt | none | |
| 7 | 1) | 100 | 42.9 | 0.5 DBTL | none | |
| 8 | 1) | 100 | 42.9 | 0.5 DBTL | none | |
| 9 | 1) | 100 | 42.9 | 0.1 Bi(III) salt | BHT | 0.1 |
| 10 | 2c) | 100 | 40.0 | 0.02 DBTL | BHT | 0.1 |
| 11 | 2c) | 100 | 40.0 | 0.02 DBTL | BHT | 0.1 |
| 12 | 2c) | 100 | 40.0 | 0.02 DBTL | BHT | 0.1 |
| 13 | 1) | 100 | 42.9 | 0.1 Bi(III) salt | BHT | 0.36 |
| 14 | 1) | 100 | 42.9 | 0.5 DBTL | BHT + Vit. E | 0.1 + 0.5 |
| 15 | 1) | 100 | 42.9 | 0.1 Bi(III) salt | Vit. E (DAB) | 0.5 |
| 16 | 1) | 100 | 42.9 | 0.1 Bi(III) salt | Vit. E (DAB) | 0.5 |
| 17 | 1) | 100 | 42.9 | 0.1 Bi(III) salt | Vit. E (DAB) | 0.1 |
| 18 | 1) | 100 | 42.9 | 0.1 Bi(III) salt | Vit. E (92%) | 0.1 |
| 19 | 1) | 100 | 42.9 | 0.1 Bi(III) salt | Vit. E (92%) | 0.2 |
| 20 | 1) | 100 | 42.9 | 0.1 Bi(III) salt | Vit. E (92%) | 0.5 |
| 21 | 1) | 100 | 42.9 | 0.1 Bi(III) salt | Vit. E (92%) | 0.8 |
| 22 | 2b) | 100 | 40.0 | 0.05 Bi(III) salt | Vit. E (92%) | 0.5 |
| 23 | 2b) | 100 | 40.0 | 0.05 Bi(III) salt | Vit. E (92%) | 0.5 |
| 24 | 2a) | 100 | 40.0 | 0.1 Bi(III) salt | Vit. E (92%) | 0.8 |
| 25 | 2a) | 100 | 40.0 | 0.1 Bi(III) salt | Vit. E (92%) | 0.8 |
| 26 | 2a) | 100 | 40.0 | 0.1 Bi(III) salt | Vit. E (92%) | 0.8 |
| 27 | 1) | 100 | 42.9 | 0.1 Bi(III) salt | Vulkanox BKF | 0.5 |
| 28 | 1) | 100 | 42.9 | 0.1 Bi(III) salt | Vulkanox BKF + dioctyldidecyl disulfide | 0.5 + 0.5 |
| 29 | 1) | 100 | 42.9 | 0.1 Bi(III) salt | Irganox 1010 | 0.5 |
| 30 | 1) | 100 | 42.9 | 0.1 Bi(III) salt | Irganox 415 | 0.5 |
| 31 | 1) | 100 | 42.9 | 0.1 Bi(III) salt | Irganox 1013 | 0.5 |
| 32 | 1) | 100 | 42.9 | 0.1 Bi(III) salt | Irganox 1076 | 0.5 |
| 33 | 1) | 100 | 42.9 | 0.1 Bi(III) salt | Irganox 1330 | 0.5 |
| 34 | 1) | 100 | 42.9 | 0.1 Bi(III) salt | Irganox 1520 | 0.5 |
| 35 | 1) | 100 | none | 0.1 Bi(III) salt | none | |
| 36 | 1) | 100 | none | 0.1 Bi(III) salt | none | |
| 37 | 1) | 100 | none | 0.1 Bi(III) salt | none | |
| 38 | 1) | 100 | none | 0.1 Bi(III) salt | none | |
| 39 | 1) | 100 | none | 0.1 Bi(III) salt | BHT | 0.1 |
| 40 | 1) | 100 | none | 0.1 Bi(III) salt | BHT | 0.1 |
| 41 | 1) | 100 | none | 0.02 DBTL | none | |
| 42 | 1) | 100 | none | 0.02 DBTL | none | |
| 43 | 1) | 100 | none | 0.02 DBTL | none | |
| 44 | 1) | 100 | none | 0.02 DBTL | none | |
| 45 | 1) | 100 | none | 0.02 DBTL | Vit. E (92%) | 0.1 |
| 46 | 1) | 100 | none | 0.02 DBTL | Vit. E (92%) | 0.1 |
| 47 | 1) | 100 | none | 0.02 DBTL | BHT | 0.1 |
| 48 | 1) | 100 | none | 0.02 DBTL | BHT | 0.1 |

DAB = Deutsches Arzneibuch = German pharmacopoeia

TABLE 2

Details of combination of mixture and isocyanate

| Specimen | Method | Crosslinking agent D | NCO content [%] | Mixture Y [pbw] | Isocyanate Z [pbw] | Foaming agent F [pbw] | Index |
|---|---|---|---|---|---|---|---|
| 1 | 1) | Isocyanate 1 | 13.30 | 100 | 6.6 | | 47 |
| 2 | 1) | Isocyanate 1 | 13.30 | 100 | 6.6 | | 47 |
| 3 | 1) | Isocyanate 1 | 13.30 | 100 | 6.6 | | 47 |
| 4 | 1) | Isocyanate 1 | 13.30 | 100 | 8.3 | | 60 |
| 5 | 1) | Isocyanate 1 | 13.30 | 100 | 7.6 | | 55 |
| 6 | 1) | Isocyanate 1 | 13.30 | 100 | 6.9 | | 50 |
| 7 | 1) | Isocyanate 1 | 13.30 | 100 | 6.6 | | 47 |
| 8 | 1) | Isocyanate 1 | 13.30 | 100 | 6.6 | | 47 |
| 9 | 1) | Isocyanate 1 | 13.30 | 100 | 6.6 | | 47 |
| 10 | 2c) | Isocyanate 2 | 23 | 100 | 4.0 | 0.1 nitrogen | 50 |

TABLE 2-continued

Details of combination of mixture and isocyanate

| Specimen | Method | Crosslinking agent D | NCO content [%] | Mixture Y [pbw] | Isocyanate Z [pbw] | Foaming agent F [pbw] | Index |
|---|---|---|---|---|---|---|---|
| 11 | 2c) | Isocyanate 2 | 23 | 100 | 4.0 | 0.1 nitrogen | 50 |
| 12 | 2c) | Isocyanate 2 | 23 | 100 | 4.0 | 0.1 nitrogen | 50 |
| 13 | 1) | Isocyanate 1 | 13.30 | 100 | 6.6 | | 47 |
| 14 | 1) | Isocyanate 1 | 13.30 | 100 | 6.6 | | 47 |
| 15 | 1) | Isocyanate 1 | 13.30 | 100 | 6.6 | | 47 |
| 16 | 1) | Isocyanate 1 | 13.30 | 100 | 6.6 | | 47 |
| 17 | 1) | Isocyanate 1 | 11.40 | 100 | 7 | | 47 |
| 18 | 1) | Isocyanate 1 | 11.40 | 100 | 7 | | 47 |
| 19 | 1) | Isocyanate 1 | 11.40 | 100 | 7 | | 47 |
| 20 | 1) | Isocyanate 1 | 11.40 | 100 | 7 | | 47 |
| 21 | 1) | Isocyanate 1 | 11.40 | 100 | 7 | | 47 |
| 22 | 2b) | Isocyanate 1 | 11.40 | 100 | 8.2 | 0.1 nitrogen | 50 |
| 23 | 2b) | Isocyanate 1 | 11.40 | 100 | 8.2 | | 50 |
| 24 | 2a) | Isocyanate 1 | 12.20 | 100 | 6.6 | | 44 |
| 25 | 2a) | Isocyanate 1 | 12.20 | 100 | 6.9 | | 46 |
| 26 | 2a) | Isocyanate 1 | 12.20 | 100 | 7.2 | | 48 |
| 27 | 1) | Isocyanate 1 | 13.30 | 100 | 6.7 | | 48 |
| 28 | 1) | Isocyanate 1 | 13.30 | 100 | 6.7 | | 48 |
| 29 | 1) | Isocyanate 1 | 13.30 | 100 | 5 | | 47 |
| 30 | 1) | Isocyanate 1 | 13.30 | 100 | 5 | | 47 |
| 31 | 1) | Isocyanate 1 | 13.30 | 100 | 5 | | 47 |
| 32 | 1) | Isocyanate 1 | 13.30 | 100 | 5 | | 47 |
| 33 | 1) | Isocyanate 1 | 13.30 | 100 | 5 | | 47 |
| 34 | 1) | Isocyanate 1 | 13.30 | 100 | 5 | | 47 |
| 35 | 1) | Isocyanate 1 | 11.40 | 100 | 10.2 | | 45 |
| 36 | 1) | Isocyanate 1 | 11.40 | 100 | 13.5 | | 60 |
| 37 | 1) | Isocyanate 1 | 11.40 | 100 | 16.9 | | 75 |
| 38 | 1) | Isocyanate 1 | 11.40 | 100 | 22.6 | | 100 |
| 39 | 1) | Isocyanate 1 | 11.40 | 100 | 10.2 | | 45 |
| 40 | 1) | Isocyanate 1 | 11.40 | 100 | 13.5 | | 60 |
| 41 | 1) | Isocyanate 2 | 23 | 100 | 5.7 | | 45 |
| 42 | 1) | Isocyanate 2 | 23 | 100 | 6.8 | | 60 |
| 43 | 1) | Isocyanate 2 | 23 | 100 | 8.5 | | 75 |
| 44 | 1) | Isocyanate 2 | 23 | 100 | 11.4 | | 100 |
| 45 | 1) | Isocyanate 2 | 23 | 100 | 5.7 | | 45 |
| 46 | 1) | Isocyanate 2 | 23 | 100 | 6.8 | | 60 |
| 47 | 1) | Isocyanate 2 | 23 | 100 | 5.7 | | 45 |
| 48 | 1) | Isocyanate 2 | 23 | 100 | 6.8 | | 60 |

TABLE 3

Results of storage of specimens

| Specimen | Non-sterile Temperature: 70° C. Storage life [weeks] | Sterile Temperature: 70° C. Storage life [weeks] | Discolouration on irradiation | Radiation dose [kGy] |
|---|---|---|---|---|
| 1 | >74 | >74 | lemon yellow | 28–33 |
| 2 | not tested | destroyed on irradiation | — | 28–33 |
| 3 | not tested | destroyed on irradiation | — | 28–33 |
| 4 | not tested | destroyed on irradiation | — | 28–33 |
| 5 | not tested | destroyed on irradiation | — | 28–33 |
| 6 | not tested | destroyed on irradiation | — | 28–33 |
| 7 | not tested | destroyed on irradiation | — | 28–33 |
| 8 | not tested | destroyed on irradiation | — | 28–33 |
| 9 | 3 | 3 | very light yellow | 28–33 |
| 10 | 2 | 3 | very light yellow | 25.5 |
| 11 | 2 | 4 | very light yellow | 32.3 |
| 12 | 2 | 4 | very light yellow | 54.8 |
| 13 | 3 | 6 | very light yellow | 28–33 |
| 14 | 35 | 42 | lemon yellow | 28–33 |
| 15 | >74 | >74 | very light yellow | 28–33 |
| 16 | >74 | >74 | very light yellow | 28–33 |
| 17 | 11 | 1 | very light yellow | 28–33 |
| 18 | 18 | 1 | very light yellow | 28–33 |
| 19 | 32 | 8 | very light yellow | 28–33 |
| 20 | >40 | >40 | very light yellow | 28–33 |
| 21 | >40 | >40 | very light yellow | 28–33 |
| 22 | >21 | >21 | very light yellow | 28–33 |
| 23 | >21 | >21 | very light yellow | 28–33 |

TABLE 3-continued

Results of storage of specimens

| Specimen | Non-sterile Temperature: 70° C. Storage life [weeks] | Sterile Temperature: 70° C. Storage life [weeks] | Discolouration on irradiation | Radiation dose [kGy] |
| --- | --- | --- | --- | --- |
| 24 | >20 | >20 | very light yellow | 28–33 |
| 25 | >20 | >20 | very light yellow | 28–33 |
| 26 | >20 | >20 | very light yellow | 28–33 |
| 27 | >71 | >71 | very light yellow | 28–33 |
| 28 | >71 | >71 | very light yellow | 28–33 |
| 29 | >54 | >54 | light yellow | 28–33 |
| 30 | >54 | >54 | light beige | 28–33 |
| 31 | >54 | >54 | light yellow | 28–33 |
| 32 | >54 | >54 | light yellow | 28–33 |
| 33 | >54 | >54 | light yellow | 28–33 |
| 34 | >54 | >54 | light yellow | 28–33 |
| 35 | <3 days | <3 days | colourless | 28–33 |
| 36 | <3 days | <3 days | colourless | 28–33 |
| 37 | <3 days | <3 days | colourless | 28–33 |
| 38 | <3 days | <3 days | colourless | 28–33 |
| 39 | >1 | >1 | lemon yellow | 28–33 |
| 40 | >1 | >1 | lemon yellow | 28–33 |
| 41 | >1 | >1 | light yellow | 28–33 |
| 42 | >1 | >1 | light yellow | 28–33 |
| 43 | >1 | >1 | light yellow | 28–33 |
| 44 | >1 | >1 | light yellow | 28–33 |
| 45 | >1 | >1 | dark yellow | 28–33 |
| 46 | >1 | >1 | dark yellow | 28–33 |
| 47 | >1 | >1 | dark yellow | 28–33 |
| 48 | >1 | >1 | dark yellow | 28–33 |

The stated base polyol was used in all the Examples.

Examples 2 to 8 and 35 to 38 show that stabilisation is absolutely essential as, when sterilised with γ radiation, these gels are degraded to such an extent that they melt or decompose after a very short time (Comparison).

Examples 9 to 12 and 17 to 18 show that even low stabiliser concentrations bring about stabilisation of the material. This is in particular the case when the material is γ sterilised.

Examples 18 to 20 show that the stability of the material is dependent upon stabiliser concentration.

Examples 1, 9, 13 to 34 and 39 to 40 prove that, in particular with relatively high molecular weight phenolic stabilisers, mixtures may be produced therefrom, together with added sulfide compounds, some of which mixtures have storage times of more than one year even under extreme temperature conditions at 70° C. in a circulating air drying cabinet. Thus, even under extreme conditions, a storage life of at least 5 years is possible even under extreme environmental temperature conditions. Even use in rapid wound dressings in first aid boxes, as are legally required in vehicles, is entirely possible.

The other examples according to the invention prove that the most varied stabilisers are effective within the stated quantity range.

What is claimed is:

1. Hydrophilic, self-adhesive polyurethane gel compositions prepared from
   a) polyether polyols with 2 to 6 hydroxyl groups and having OH values of 20 to 112 and an ethylene oxide (EO) content of ≧10 wt. %,
   b) anti-oxidants,
   c) bismuth(III) carboxylates soluble in the polyether polyols a) and based on carboxylic acids having 2 to 18 C atoms as catalysts together with
   d) hexamethylene diisocyanate or a modified hexamethylene diisocyanate, wherein the product of the functionalities of the polyurethane-forming components a) and d) is at least 5.2, the quantity of catalyst c) amounts to 0.005 to 0.25 wt. %, relative to the polyols a), the quantity of anti-oxidants b) is in the range of ≧0.1 wt. %, relative to the polyols a) and a ratio of free NCO groups in component d) to the free OH groups in component a) in the range from 0.30 to 0.70 is selected.

2. Hydrophilic, self-adhesive gel compositions according to claim 1, characterised in that polyether polyols with 3 to 4 hydroxyl groups and having an OH value of 30 to 56 and an EO content of ≧20 wt. % are used.

3. Hydrophilic gel compositions according to claim 1, characterised in that a hexamethylene diisocyanate modified by prepolymerisation with polyether diols of an OH value of 200 to 600 is used as the isocyanate component.

4. Hydrophilic gel compositions according to claim 1, characterised in that up to 100 wt. % of additives, relative to the polyols a), are added to the gel compositions.

5. Hydrophilic gel compositions according to claim 1, characterised in that the gel compositions are foamed, wherein the density of the foamed gel is reduced as far as down to ⅙ of the initial density of the gel composition.

6. A moulding comprising a hydrophilic gel prepared from,
   A) polyether polyols with 2 to 6 hydroxyl groups and having OH values of 20 to 112 and an ethylene oxide (EO) content of ≧10 wt. %,
   B) anti-oxidants,
   C) bismuth(III) carboxylates soluble in the polyether polyols a) and based on carboxylic acids having 2 to 18 C atoms as catalysts together with,
   D) hexamethylene diisocyanate or a modified hexamethylene diisocyanate, wherein the product of the functionalities of the polyurethane-forming components a) and d) is at least 5.2, the quantity of catalyst c) amounts to 0.005 to 0.25 wt. % relative to the polyols a), the quantities of anti-oxidants b) is in the range of ≧0.1 wt. % relative to the polyols a) and the ratio of free NCO groups in component d) to the free OH groups in component a) is in the range from 0.30 to 0.70.

7. An adhesive layer comprising a hydrophilic gel prepared from,

A) polyether polyols with 2 to 6 hydroxyl groups and having OH values of 20 to 112 and an ethylene oxide (EO) content of ≧10 wt. %, B) anti-oxidants, C) bismuth(III) carboxylates soluble in the polyether polyols a) and based on carboxylic acids having 2 to 18 C atoms as catalysts together with, D) hexamethylene diisocyanate or a modified hexamethylene diisocyanate, wherein the product of the functionalities of the polyurethane-forming components a) and d) is at least 5.2, the quantity of catalyst c) amounts to 0.005 to 0.25 wt. % relative to the polyols a), the quantities of anti-oxidants b) is in the range of ≧0.1 wt. % relative to the polyols a) and the ratio of free NCO groups in component d) to the free OH groups in component a) is in the range from 0.30 to 0.70.

* * * * *